Nov. 20, 1962  R. W. STEVENS  3,065,336
MEANS FOR LIGHTING SPACED COMPARTMENTS
Filed Oct. 27, 1959

2 Sheets-Sheet 1

INVENTOR
RICHARD W. STEVENS
BY
*Laurence Burr*
ATTORNEY

United States Patent Office 3,065,336
Patented Nov. 20, 1962

3,065,336
MEANS FOR LIGHTING SPACED COMPARTMENTS
Richard William Stevens, London, England, assignor to Thorn Electrical Industries Limited, London, England, a company of Great Britain
Filed Oct. 27, 1959, Ser. No. 848,974
1 Claim. (Cl. 240—9)

The present invention relates to the lighting of spaced compartments which have at least one open or light-transmitting boundary. One example is a number of cubicles divided out of a larger room and having their walls extending upward only a part of the distance to the ceiling of the larger room. In this example the top of the cubicle constitutes the open boundary. The top of the cubicle may be covered by light-transmitting material.

Another example of the compartments with which the invention is concerned is the landings of a staircase, these landings having open or light-transmitting boundaries facing the well of the staircase.

For the purpose of lighting such spaced compartments it is customary to provide a number of small lamps, one or more in each compartment. This entails the provision of a considerable amount of lighting equipment including long and expensive wiring runs. The luminous efficiency of small lamps is, moreover, in general, substantially less than that of larger lamps.

The present invention has for one of its objects to provide an efficient but less expensive system for lighting such compartments.

According to the present invention, a system for lighting spaced compartments which have at least one open or light-transmitting boundary comprises a light source with optical means for directing the light from the source in a beam passing near the said boundary of each of the compartments, and light-abstracting means for each compartment arranged to direct light from the beam into that compartment through the said boundary thereof. The light source may be a single lamp. Preferably each of the light-abstracting means is arranged to collect light from a different part of the beam.

Figure 1:
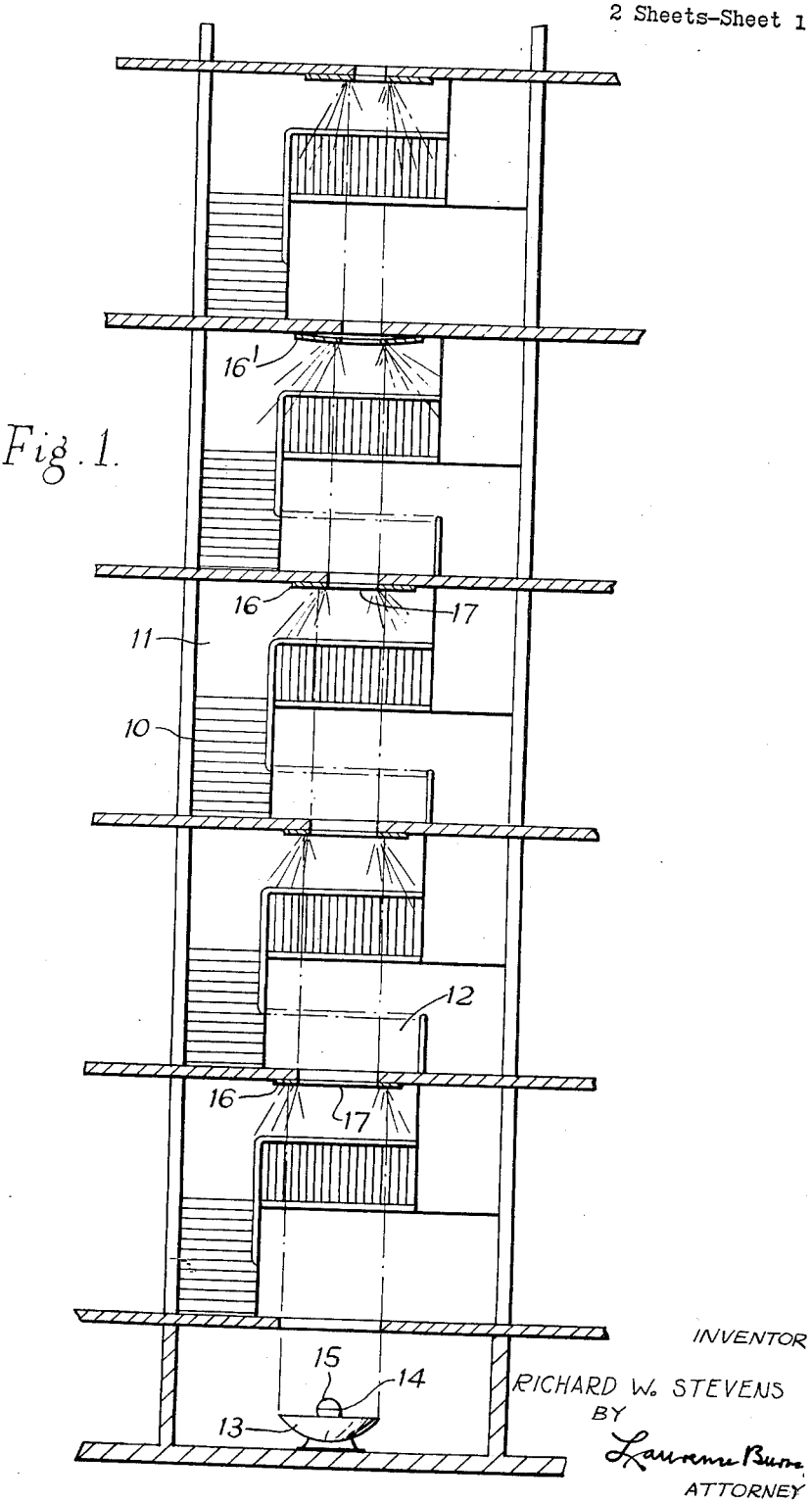
Figure 2:
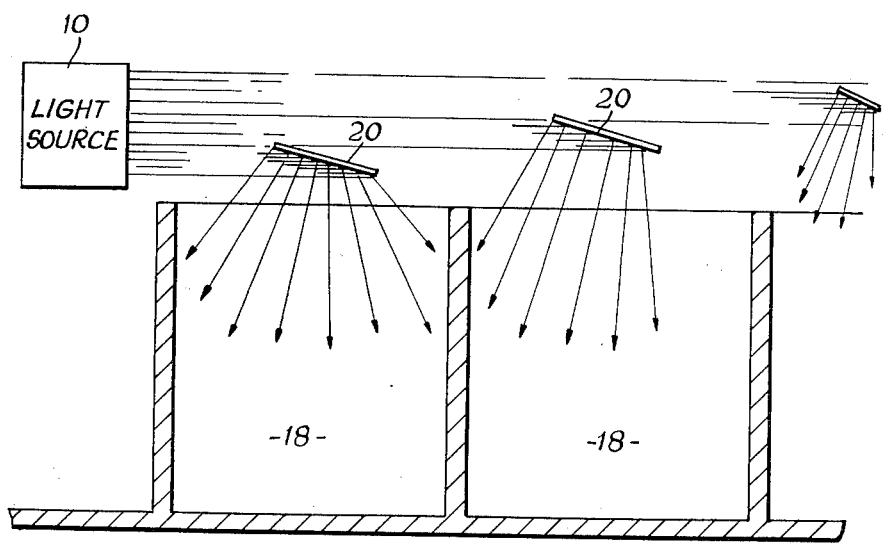

The invention will be described, by way of example, with reference to the accompanying drawings in which:

FIG. 1 is a diagrammatic view in sectional elevation of a staircase having landings illuminated in accordance with the present invention, and FIG. 2 is a diagrammatic view in sectional elevation illustrating how the invention may be applied to the illumination of a row of cubicles.

Referring to FIG. 1, there is shown a staircase 10 having landings 11 which it is desired to illuminate. The staircase has a central stair well 12.

At the bottom of the stair well 12 is mounted a parabolic reflector 13 having at its focus a light source 14 of small dimensions, such for instance as the filament of an incandescent lamp, which may have a rating of several kilowatts. The upper surface 15 of the lamp envelope, which may be spherical, is silvered in order to render it opaque and reflecting. Thus the direct emission of light in an upward direction is prevented and all the light is directed upon the reflector 13 which produces a nearly parallel vertical beam of light passing upward through the stair well. Owing to the finite size of the light source 14 the beam will diverge slightly.

At each landing 11 there is suspended or fixed to the ceiling a light-interceptor 16 having a central aperture 17 through which the central part of the beam passes, the sizes of the apertures being made progressively smaller in successive interceptors, proceeding from the source. Thus a part of the light from the beam is directed into each landing 11 and the light in the beam may be divided equally between the landings. The interceptors may be shaped to give the desired distribution of illumination at each landing. For instance the interceptor 16' is shown as having its outer parts inclined slightly upward.

The interceptor 16 at the landings 11 may be partly light-transmitting and partly light-reflecting: for instance they may be of opal acrylic sheet material. This material is available in a number of grades having different primary reflection and transmission characteristics, but in all the commercially available materials the over-all efficiency is higher. For instance in one case the reflection factor is 42% and the transmission factor 52%: thus only 6% is lost. The materials obtainable range from one having a transmission factor of 80% and reflection factor of 16% to one having a transmission factor of 6% and a reflection factor of 84%.

The material used can be chosen according to requirements so that the light distributed to a landing is either mainly in the direction of the main beam (when the transmission factor is high) or mainly in the direction opposite to that of the main beam (when the reflection factor is high) or in required proportion between these two extremes. Owing to the diffusing nature of the material, when the interceptor is a flat sheet, the light abstracted from the beam, whether by transmission or reflection, will be distributed uniformly about the interceptor, as from a flat uniformly diffusing surface.

It will be evident that, if preferred, the light source with its beam-forming reflector may be disposed at the top of the stair well instead of at the bottom, the beam being then directed downward. Moreover refracting optical means such as one or more lenses or a combination of reflecting and refracting means may be used to form the beam.

When it is required to illuminate a number of cubicles arranged as hereinbefore described, if these are in a row they may be illuminated by interceptors arranged in the path of a beam passing close and parallel to the ceiling of the room above the cubicles. This is illustrated in FIG. 2 which shows a row of cubicles 18 open at their tops. Light from a source 19 including suitable optical means is projected in a horizontal beam over the tops of the cubicles. An interceptor 20 is arranged above each cubicle and each extracts light from a different part of the beam. Where the interceptors are partly light-transmitting, as hereinbefore described, there may be partial or complete overlap between the interceptors so that all extract a part of the light from the same part, or from the whole, of the beam.

If the cubicles are not in a single row, either a number of beams may be provided, one for each row, or suitable reflectors may be provided to direct one main beam in a zig-zag path over the cubicles.

I claim:

A lighting system for a sequential series of spaced compartments, each compartment having an opening in the top wall in register with the opening in the bottom wall of another compartment to provide a path through all said compartments for a beam of light, said system comprising a series of light reflecting panels each mounted on the upper wall of one of said compartments, each said panel having a central light-transmitting portion in alignment with the opening in the top wall of said compartment, said opening being large enough to pass substantially all of the light transmitted by said portion, all said light-transmitting portions being in register with each other, a light source, means for directing a beam of parallel light rays from said source onto and through said panels, successive panels having light-transmitting portions of progressively smaller area, said light source being diposed adjacent the light-reflecting panel with light-transmitting portion of greatest area, so that each panel reflects some of the light into its corresponding compartment from the outer portion of the beam and transmits an inner portion of the beam, the light being reflected from each panel by the panel's side nearest the light source.

References Cited in the file of this patent

UNITED STATES PATENTS

| | | |
|---|---|---|
| 214,835 | Molera et al. | Apr. 29, 1879 |
| 550,376 | Lugrin | Nov. 26, 1895 |
| 657,693 | Egnell | Sept. 11, 1900 |
| 1,632,254 | Vinogradov | June 14, 1927 |
| 2,067,416 | Rolph | Jan. 12, 1937 |
| 2,186,439 | Whalen | Jan. 9, 1940 |
| 2,756,323 | Tulsy | July 24, 1956 |
| 2,853,596 | Weitzner | Sept. 23, 1958 |
| 2,913,576 | Gilleard | Nov. 17, 1959 |